(12) United States Patent
Kawasaki et al.

(10) Patent No.: US 10,434,842 B2
(45) Date of Patent: Oct. 8, 2019

(54) IN-VEHICLE INVERTER DEVICE AND IN-VEHICLE FLUID MACHINE

(71) Applicant: KABUSHIKI KAISHA TOYOTA JIDOSHOKKI, Kariya-shi, Aichi-ken (JP)

(72) Inventors: Takao Kawasaki, Kariya (JP); Yoshiki Nagata, Kariya (JP); Fumihiro Kagawa, Kariya (JP); Shunsuke Ambo, Kariya (JP); Koki Suzuki, Kariya (JP)

(73) Assignee: KABUSHIKI KAISHA TOYOTA JIDOSHOKKI, Kariya-shi, Aichi-ken (JP)

( * ) Notice: Subject to any disclaimer, the term of this patent is extended or adjusted under 35 U.S.C. 154(b) by 120 days.

(21) Appl. No.: 15/468,359

(22) Filed: Mar. 24, 2017

(65) Prior Publication Data
US 2017/0274735 A1 Sep. 28, 2017

(30) Foreign Application Priority Data
Mar. 28, 2016 (JP) .................................. 2016-064205

(51) Int. Cl.
*B60L 50/50* (2019.01)
*B60H 1/32* (2006.01)
(Continued)

(52) U.S. Cl.
CPC ............ *B60H 1/3222* (2013.01); *B60L 50/50* (2019.02); *H02K 7/14* (2013.01); *H02M 1/14* (2013.01);
(Continued)

(58) Field of Classification Search
CPC ........ B60H 1/3222; B60L 11/18; H02M 1/14; H02M 7/44
(Continued)

(56) References Cited

U.S. PATENT DOCUMENTS 9,042,133 B2 * 5/2015 Ide .......................... H02M 1/44
363/39
2004/0062064 A1 4/2004 Pelly
(Continued)

FOREIGN PATENT DOCUMENTS

JP 2005-160263 A 6/2005
JP 2006-500892 A 1/2006
(Continued)

OTHER PUBLICATIONS

Communication dated Oct. 26, 2018, from Korean Intellectual Property Office in counterpart application No. 10-2017-0034347.

*Primary Examiner* — Daniel Kessie
*Assistant Examiner* — Swarna N Chowdhuri
(74) *Attorney, Agent, or Firm* — Sughrue Mion, PLLC (57) ABSTRACT

An in-vehicle inverter device includes a noise reduction circuit, which has a common mode choke coil configured to reduce common mode noise and normal mode noise contained in DC power, and an inverter circuit, which receives the DC power in which the noise has been reduced. The noise reduction circuit includes: an input-side capacitor and an input-side resistor provided on the input side of the choke coil; an output-side capacitor and an output-side resistor provided on the output side of the choke coil; a first filter circuit that includes the choke coil, the input-side capacitor, and the input-side resistor; and a second filter circuit that includes the choke coil, the output-side capacitor, and the output-side resistor. The first and the second filter circuits reduce leakage noise generated in the inverter circuit.

2 Claims, 3 Drawing Sheets

(51) Int. Cl.
  *H02K 7/14*   (2006.01)
  *H02M 7/44*   (2006.01)
  *H02P 27/08*  (2006.01)
  *H02M 1/14*   (2006.01)
  *H02M 7/5387*    (2007.01)
  *H02M 1/12*      (2006.01)
(52) U.S. Cl.
  CPC .............. *H02M 7/44* (2013.01); *H02P 27/08*
         (2013.01); *H02M 7/5387* (2013.01); *H02M*
         *2001/123* (2013.01)
(58) Field of Classification Search
  USPC ....................................................... 307/10.1
  See application file for complete search history.

(56) References Cited

U.S. PATENT DOCUMENTS

| | | |
|---|---|---|
| 2009/0230902 A1 | 9/2009 | Nakagami et al. |
| 2010/0172764 A1 | 7/2010 | Nakano et al. |
| 2013/0051081 A1 | 2/2013 | Isono |
| 2013/0301319 A1* | 11/2013 | Ide .......................... H02M 1/44 363/52 |
| 2014/0191823 A1* | 7/2014 | Otsubo ................. H02M 1/126 333/181 |
| 2015/0077025 A1* | 3/2015 | Suzuki ................. B62D 5/0463 318/400.02 |
| 2016/0028241 A1* | 1/2016 | Ichikawa ................ H02J 50/12 307/9.1 |

FOREIGN PATENT DOCUMENTS

| | | |
|---|---|---|
| JP | 2009-182055 A | 8/2009 |
| JP | 2009-267596 A | 11/2009 |
| JP | 5039515 B2 | 10/2012 |
| KR | 1020130024784 A | 3/2013 |
| KR | 200475245 Y1 | 11/2014 |

* cited by examiner

IN-VEHICLE INVERTER DEVICE AND IN-VEHICLE FLUID MACHINE

BACKGROUND OF THE INVENTION

The present invention relates to an in-vehicle inverter device and an in-vehicle fluid machine.

Japanese Patent No. 5039515 discloses an in-vehicle inverter device that converts DC power into AC power. This in-vehicle inverter device has an inverter circuit having switching elements.

DC power to be converted by an in-vehicle inverter device may be contaminated by both of common mode noise and normal mode noise. In this case, these noises may hinder normal power conversion by the in-vehicle inverter device.

In an inverter circuit, for example, switching actions by switching elements or the like can generate noise. If the noise leaks out of the in-vehicle inverter device, it may adversely affect other in-vehicle devices connected to the in-vehicle inverter device.

In particular, since the specifications of the in-vehicle devices connected to the in-vehicle inverter device differ depending on the type of vehicle, the frequency band of undesirable noise may be different according to the type of vehicle. For this reason, in-vehicle inverter devices are sometimes desired to suppress leakage of noise in a wide frequency band so that the devices can be applied to various types of vehicles.

In an in-vehicle inverter device, one or more of unintended resonance circuits may be formed due to parasitic capacitance or the like. In this case, noise of a frequency close to the resonance frequency of the above-mentioned unintended resonance circuit may increase in amplitude. If the frequency band of noise for which leakage is desired to be suppressed is widened to improve the versatility as described above, a resonance frequency may be included in that frequency band, so that leakage of noise at frequencies close to the resonance frequency may not be sufficiently suppressed.

SUMMARY OF THE INVENTION

An objective of the present invention is to provide an in-vehicle inverter device and an in-vehicle fluid machine that are capable of suppressing leakage of noise generated in an inverter circuit in a wide frequency band.

To achieve the foregoing objective, an in-vehicle inverter device configured to convert DC power to AC power is provided. The in-vehicle inverter device includes a noise reduction circuit and an inverter circuit. The noise reduction circuit includes a common mode choke coil configured to reduce common mode noise and normal mode noise contained in the DC power. The inverter circuit includes a switching element and receives the DC power in which noise has been reduced by the noise reduction circuit. The noise reduction circuit includes an input-side capacitor and an input-side resistor, an output-side capacitor and an output-side resistor, a first filter circuit, and a second filter circuit. The input-side capacitor and the input-side resistor are provided on an input side of the common mode choke coil and connected in series to each other. The output-side capacitor and the output-side resistor are provided on an output side of the common mode choke coil and connected in series to each other. The first filter circuit includes the common mode choke coil, the input-side capacitor, and the input-side resistor. The second filter circuit includes the common mode choke coil, the output-side capacitor, and the output-side resistor. The first filter circuit and the second filter circuit are configured to reduce leakage noise generated in the inverter circuit.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

An in-vehicle inverter device and an in-vehicle fluid machine that accommodates the in-vehicle inverter device according to one embodiment will now be described. In the present embodiment, the in-vehicle fluid machine is an in-vehicle motor-driven compressor that is used in an in-vehicle air conditioner.

An outline of the in-vehicle air conditioner and the in-vehicle motor-driven compressor will now be described.

Figure 1:
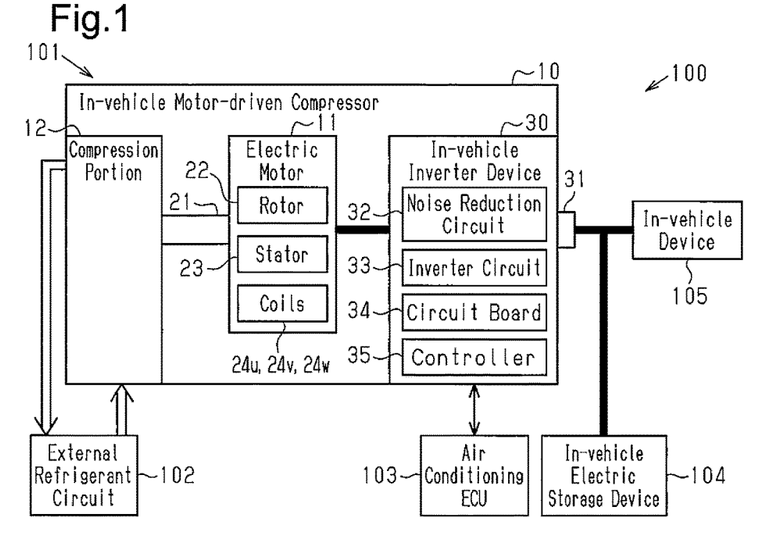
FIG. 1 is a block diagram schematically illustrating an in-vehicle inverter device, an in-vehicle motor-driven compressor, and a vehicle.

As shown in FIG. 1, a vehicle 100 has an in-vehicle air conditioner 101, which includes an in-vehicle motor-driven compressor 10 and an external refrigerant circuit 102. The external refrigerant circuit 102 supplies refrigerant, which is fluid, to the in-vehicle motor-driven compressor 10. The external refrigerant circuit 102 includes, for example, a heat exchanger and an expansion valve. The in-vehicle motor-driven compressor 10 compresses the refrigerant, and the external refrigerant circuit 102 performs heat exchange of the refrigerant and expands the refrigerant. This allows the in-vehicle air conditioner 101 to cool or warm the passenger compartment.

The in-vehicle air conditioner 101 includes an air conditioning ECU 103, which controls the entire in-vehicle air conditioner 101. The air conditioning ECU 103 is configured to obtain parameters such as the temperature of the passenger compartment and a temperature set by a user (a target temperature). Based on these parameters, the air conditioning ECU 103 outputs various commands such as an ON-OFF command to the in-vehicle motor-driven compressor 10.

The in-vehicle motor-driven compressor 10 includes an electric motor 11 and a compression portion 12 that compresses refrigerant by driving the electric motor 11.

Figure 2:
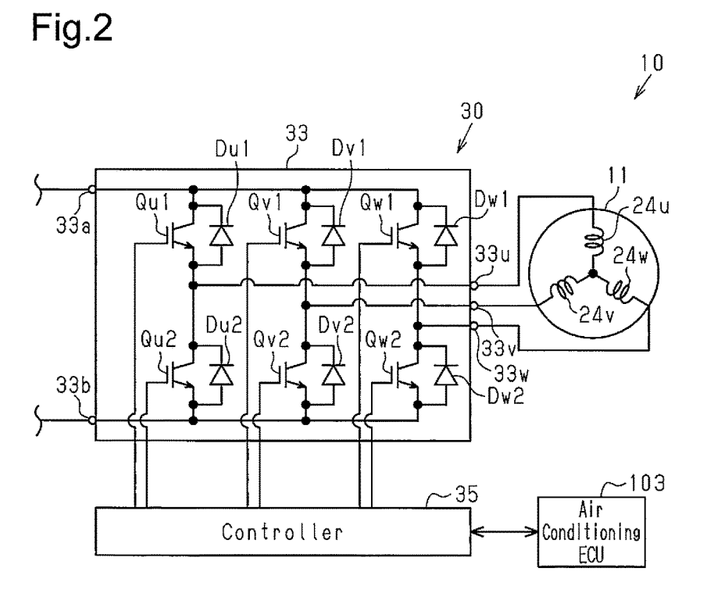
FIG. 2 is a circuit diagram showing the electrical configuration of the inverter circuit.

The electric motor 11 includes a rotary shaft 21, a rotor 22 fixed to the rotary shaft 21, a stator 23 arranged to be opposed to the rotor 22, and three-phase coils 24u, 24v, 24w wound about the stator 23. As shown in FIG. 2, the coils 24u, 24v, 24w are connected to form a Y-connection. The rotor 22 and the rotary shaft 21 rotate when the coils 24u, 24v, 24w are electrified in a predetermined pattern.

When the electric motor 11 operates, the compression portion 12 compresses refrigerant. Specifically, when the rotary shaft 21 is rotated, the compression portion 12 compresses refrigerant supplied from the external refrigerant circuit 102 and discharges the compressed refrigerant. The compression portion 12 may be any type such as a scroll type, a piston type, and a vane type.

The in-vehicle motor-driven compressor 10 includes an in-vehicle inverter device 30 for driving the electric motor 11. In the present embodiment, the in-vehicle inverter device 30 is attached to the in-vehicle motor-driven compressor 10. For example, the in-vehicle motor-driven compressor 10 includes a housing that accommodates the compression portion 12 and the electric motor 11, and the in-vehicle inverter device 30 is attached to the housing.

The vehicle 100 includes an in-vehicle electric storage device 104 and an in-vehicle device 105. The in-vehicle electric storage device 104 serves as a DC power supply that supplies DC power to the in-vehicle inverter device 30. The in-vehicle device 105 is provided separately from the in-vehicle air conditioner 101.

The in-vehicle electric storage device 104 may be any type as long as it can charge/discharge DC power. For example, a rechargeable battery or an electric double-layer capacitor may be employed. The in-vehicle electric storage device 104 is electrically connected to both a connector 31 provided in the in-vehicle inverter device 30 and the in-vehicle device 105, and supplies power to both the in-vehicle inverter device 30 and the in-vehicle device 105. That is, in the present embodiment, the in-vehicle device 105 and the in-vehicle inverter device 30 are connected in parallel to the in-vehicle electric storage device 104, and the in-vehicle electric storage device 104 is shared by the in-vehicle device 105 and the in-vehicle inverter device 30.

The in-vehicle inverter device 30 includes a noise reduction circuit 32 and an inverter circuit 33. The noise reduction circuit 32 reduces both normal mode noise and common mode noise contained in DC power delivered from the connector 31. The inverter circuit 33 receives DC power in which the noise has been reduced by the noise reduction circuit 32, and converts the DC power into AC power.

In view of the fact that the DC power from the in-vehicle electric storage device 104 is delivered to the connector 31, the DC power delivered from the connector 31 is regarded as DC power delivered from the in-vehicle electric storage device 104. In the present embodiment, the connector 31 corresponds to a power input portion.

The in-vehicle inverter device 30 includes a circuit board 34 on which the noise reduction circuit 32 and the inverter circuit 33 are mounted. Patterned traces are provided on the circuit board 34. The patterned traces include flat plate-shaped sections such as bus bars.

For purposes of illustration, the inverter circuit 33 will be described first.

As shown in FIG. 2, the inverter circuit 33 has two inverter input terminals 33a, 33b connected to the noise reduction circuit 32 and three inverter output terminals 33u, 33v, 33w connected to the electric motor 11.

The inverter circuit 33 includes U-phase switching elements $Qu1$, $Qu2$ corresponding to the U-phase coil $24u$, V-phase switching elements $Qv1$, $Qv2$ corresponding to the V-phase coil $24v$, and W-phase switching elements $Qw1$, $Qw2$ corresponding to the W-phase coil $24w$.

The switching elements $Qu1$, $Qu2$, $Qv1$, $Qv2$, $Qw1$, and $Qw2$ (hereinafter, simply referred to as the switching elements $Qu1$ to $Qw2$) are each a power switching element constituted, for example, by an insulated gate bipolar transistor (IGBT). The switching elements $Qu1$ to $Qw2$ are not limited to IGBTs, but may be any type of switching elements. The switching elements $Qu1$ to $Qw2$ include freewheeling diodes (body diodes) $Du1$ to $Dw2$.

The U-phase switching elements $Qu1$, $Qu2$ are connected to each other in series by a connection wire that is connected to the U-phase coil $24u$ via a U-phase inverter output terminal $33u$. The collector of the first U-phase switching elements $Qu1$ is connected to the first inverter input terminal $33a$. The emitter of the second U-phase switching elements $Qu2$ is connected to the second inverter input terminal $33b$.

Except for the connected coil, the other switching elements $Qv1$, $Qv2$, $Qw1$, $Qw2$ have the same connection structure as the U-phase power switching elements $Qu1$, $Qu2$. That is, the connection wire that connects the V-phase switching elements $Qv1$, $Qv2$ in series is connected to the V-phase coil $24v$ via a V-phase inverter output terminal $33v$, and the connecting wire that connects the W-phase switching elements $Qw1$, $Qw2$ in series is connected to the W-phase coil $24w$ via a W-phase inverter output terminal $33w$.

The in-vehicle inverter device 30 includes a controller 35, which controls the inverter circuit 33 (specifically, switching actions of the switching elements $Qu1$ to $Qw2$). The controller 35 is electrically connected to the air conditioning ECU 103. Based on commands from the air conditioning ECU 103, the controller 35 periodically turns the switching elements $Qu1$ to $Qw2$ on and off. Specifically, based on commands from the air conditioning ECU 103, the controller 35 performs pulse width modulation control (PWM control) on the switching elements $Qu1$ to $Qw2$. More specifically, the controller 35 uses a carrier signal and a commanded voltage value signal (signal for comparison) to generate control signals. The controller 35 executes ON-OFF control on the switching elements $Qu1$ to $Qw2$ by using the generated control signals, thereby causing the inverter circuit 33 to convert power.

The in-vehicle device 105 will now be described.

Figure 3:
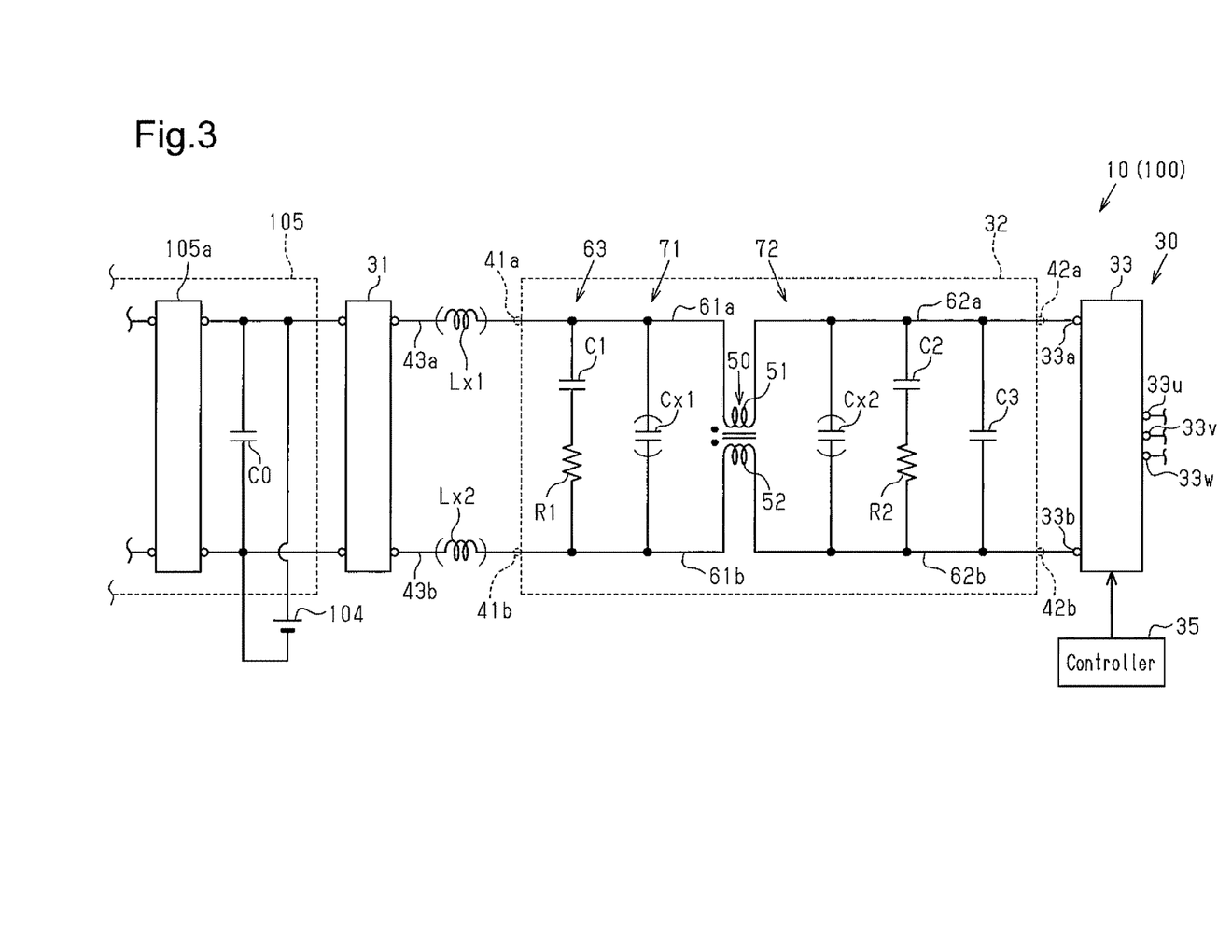
FIG. 3 is a circuit diagram showing the electrical configuration of the in-vehicle inverter device.

As shown in FIG. 3, the in-vehicle device 105 is, for example, a power control unit (PCU) that drives the traveling motor mounted on the vehicle 100 by using the DC power supplied from the in-vehicle electric storage device 104. The in-vehicle device 105 includes, for example, a boost converter 105a and a traveling inverter (not shown). The boost converter 105a includes a boost switching element and periodically turns the boost switching element on and off to boost the DC power of the in-vehicle electric storage device 104. The traveling inverter converts the DC power that has been boosted by the boost converter 105a into driving power that can drive the traveling motor. In addition, the in-vehicle device 105 includes a power supply capacitor C0 connected in parallel with both the boost converter 105a and the in-vehicle electric storage device 104.

In the above described configuration, noise generated due to switching actions of the boost switching element flows into the in-vehicle inverter device 30 as normal mode noise. In other words, the normal mode noise contains a noise component corresponding to the switching frequency of the boost switching element. The noise component corresponding to the switching frequency of the boost switching element can contain not only a noise component having the same frequency as the switching frequency, but also its harmonic components.

The noise reduction circuit 32 will now be described.

As shown in FIG. 3, the noise reduction circuit 32 includes two input portions 41a, 41b and two output portions 42a, 42b.

The input portions 41a, 41b of the noise reduction circuit 32 are connected to the connector 31 via wires (for example, harnesses) 43a, 43b provided in the in-vehicle inverter device 30. Specifically, the first input portion 41a of the input portions 41a, 41b is connected to the first wire 43a, and the second input portion 41b is connected to the second wire 43b. As a result, the DC power from the in-vehicle electric storage device 104 is delivered to the noise reduction circuit 32.

The output portions 42 a, 42 b of the noise reduction circuit 32 are connected to the inverter circuit 33 (more specifically, the inverter input terminals 33a, 33b). As a result, the DC power output from the output portions 42a, 42b of the noise reduction circuit 32 is delivered to the inverter circuit 33.

The input portions 41a, 41b of the noise reduction circuit 32 are merely conceptual representation of the electrical input sections of the noise reduction circuit 32, and may or may not be constituted by terminals. The same applies to the output portions 42a, 42b of the noise reduction circuit 32. In short, the physical configurations (for example, terminals) of the input portions 41a, 41b and the output portions 42a, 42b are not necessarily required.

The noise reduction circuit 32 includes a common mode choke coil 50 that reduces both common mode noise and normal mode noise contained in the DC power delivered from the connector 31.

The common mode choke coil 50 has a first winding 51 and a second winding 52. The windings 51, 52 are wound such that, when common mode currents, or currents in the same direction, flow through the windings 51 and 52, magnetic fluxes that intensify each other are generated, and that when normal mode currents, or currents in the opposite directions, flow through the windings 51 and 52, mutually cancelling magnetic fluxes are generated. When normal mode currents flow through the windings 51 and 52, a leakage magnetic flux is generated in the common mode choke coil 50. The common mode choke coil 50 reduces the normal mode noise with the leakage magnetic flux. The common mode choke coil 50 has a core around which the windings 51 and 52 are wound.

The noise reduction circuit 32 includes a first input line 61a, which connects the first input portion 41a and the input end of the first winding 51 to each other, and a second input line 61b, which connects the second input portion 41b and the input end of the second winding 52 to each other. The noise reduction circuit 32 includes a first output line 62a, which connects the first output portion 42a and the output end of the first winding 51 to each other, and a second output line 62b, which connects the second output portion 42b and the output end of the second winding 52 to each other.

When the switching elements Qu1 to Qw2 of the inverter circuit 33 are periodically turned on and off, leakage noise is generated in the inverter circuit 33. The leakage noise contains the carrier frequency, which is the frequency of the carrier signal used for the PWM control of the switching elements Qu1 to Qw2, and the harmonic components of the carrier frequency. The frequency band of the leakage noise is therefore wide.

In addition, as shown in FIG. 3, parasitic capacitors Cx1, Cx2 may be generated in the in-vehicle inverter device 30. The parasitic capacitors Cx1, Cx2 be generated due to the structure of the common mode choke coil 50 or due to the structure of the in-vehicle inverter device 30 such as interaction with the circuit board 34. The parasitic capacitors Cx1, Cx2 are formed on the opposite sides of the common mode choke coil 50. The input-side parasitic capacitor Cx1 is generated on the input side of the common mode choke coil 50, and the output-side parasitic capacitor Cx2 is generated on the output side of the common mode choke coil 50.

Also, parasitic inductors Lx1, Lx2 exist in the wires 43a, 43b, which connect the connector 31 and the noise reduction circuit 32 to each other. The lines 61a, 61b, 62a, 62b and the wires that connect the noise reduction circuit 32 and the inverter circuit 33 to each other are sufficiently shorter than the wires 43a, 43b. Therefore, in the present embodiment, the parasitic inductances of these wires are negligible.

The capacitances of the parasitic capacitors Cx1, Cx2 (hereinafter, also referred to as parasitic capacitances) and the inductances of the parasitic inductors Lx1, Lx2 (hereinafter, also referred to as parasitic inductances) are usually negligibly low. Thus, the influences of the parasitic capacitances and the parasitic inductances are negligible for leakage noise in relatively low frequency bands.

The inventors focused attention on the fact that the parasitic capacitance and the parasitic inductance cannot be ignored for leakage noise in high frequency bands.

That is, the existence of the parasitic capacitors Cx1, Cx2 and the parasitic inductors Lx1, Lx2 generates one or more unintended resonance circuits in the in-vehicle inverter device 30. Such unintended resonance circuits include one that includes the common mode choke coil 50 and at least one of the parasitic capacitors Cx1, Cx2, and one that includes both parasitic inductors Lx1, Lx2 and the input-side parasitic capacitor Cx1.

Since the parasitic capacitances and the parasitic inductances are relatively low values, the resonance frequencies of the above unintended resonance circuits tend to be high. For this reason, when the frequency band in which leakage noise is desired to be reduced (hereinafter referred to as a reduction target band) is relatively narrow and the upper limit value of the reduction target band is relatively low, the resonance frequencies of the unintended resonance circuits tend to be higher than the reduction target band.

When the reduction target band is wide, the reduction target band may include the resonance frequencies of the above-mentioned unintended resonance circuits. In this case, leakage noise of a frequency close to the resonance frequencies of the above-mentioned unintended resonance circuits may fail to be sufficiently reduced because the amplitude of the leakage noise is increased by the resonance phenomenon.

In contrast, the noise reduction circuit 32 of the present embodiment is configured to reduce leakage noise in a wide reduction target band that contains frequencies close to the resonance frequencies of the above-mentioned unintended resonance circuits. The reduction target band of the present embodiment is, for example, from 0.53 to 10 MHz, more preferably, from 0.1 to 30 MHz.

Specifically, as shown in FIG. 3, the noise reduction circuit 32 includes an input-side capacitor C1 and an input-side resistor R1, which are provided on the input side of the common mode choke coil 50 and connected in series to each other. The noise reduction circuit 32 also includes an output-side capacitor C2 and an output-side resistor R2, which are provided on the output side of the common mode choke coil 50 and connected in series to each other.

The input-side capacitor C1 and the input-side resistor R1 are connected in parallel to the common mode choke coil 50. Specifically, the serially-connected body of the input-side capacitor C1 and the input-side resistor R1 is connected to the first input line 61a and the second input line 61b. The capacitance of the input-side capacitor C1 is set to be higher than the capacitance of the input-side parasitic capacitor Cx1. However, the capacitance of the input-side capacitor C1 is lower than the capacitance of the power supply capacitor C0.

The wires 43a, 43b and the serially-connected body of the input-side capacitor C1 and the input-side resistor R1 are connected to each other via the input lines 61a, 61b. For this reason, the parasitic inductors Lx1, Lx2 and the serially-connected body of the input-side capacitor C1 and the input side resistance R1 form an LC resonance circuit 63 with the input-side resistor R1.

The output-side capacitor C2 and the output-side resistor R2 are connected in parallel to the common mode choke coil 50. Specifically, the serially-connected body of the output-side capacitor C2 and the output-side resistor R2 is connected to the first output line 62a and the second output line 62b. The capacitance of the output-side capacitor C2 is set to be higher than the capacitance of the output-side parasitic capacitor Cx2.

The capacitors C1 and C2 preferably behave as capacitors in at least the reduction target band. In other words, in the capacitors C1 and C2, the capacitance component is preferably dominant over the inductance component (ESL component) at least in the reduction target band.

With this configuration, the common mode choke coil 50, the input-side capacitor C1, and the input-side resistor R1 constitute a first filter circuit 71. The common mode choke coil 50, the output-side capacitor C2, and the output-side resistor R2 constitute a second filter circuit 72. That is, the noise reduction circuit 32 of the present embodiment has two filter circuits 71, 72.

In the reduction target band, the impedances of the filter circuits 71, 72 are lower than the impedance of an unintended resonance circuit having at least one of the parasitic capacitors Cx1, Cx2 as a component. For this reason, the filter circuits 71, 72 are dominant over the unintended resonance circuit in the reduction target band, and the leakage noise preferentially flows to the filter circuits 71, 72 over the unintended resonance circuit.

The input-side resistor R1 is included as a component in both of the first filter circuit 71 and the LC resonance circuit 63, which includes the parasitic inductors Lx1, Lx2. The input-side resistor R1 functions as a damping portion that lowers the Q factors of the first filter circuit 71 and the LC resonance circuit 63. Similarly, the output-side resistor R2 is included as a component in the second filter circuit 72. The output-side resistor R2 functions as a damping portion that lowers the Q factor of the second filter circuit 72.

The noise reduction circuit 32 includes a smoothing capacitor C3. The smoothing capacitor C3 is provided at a stage behind the serially-connected body of the output-side capacitor C2 and the output-side resistor R2. More specifically, the smoothing capacitor C3 is closer to the inverter circuit 33 than of the serially-connected body. The capacitance of the smoothing capacitor C3 is set to be higher than the capacitance of the output-side capacitor C2. The inductance component (ESL component) of the smoothing capacitor C3 is dominant at frequencies equal to or higher than a predetermined frequency within the reduction target band. Although not illustrated, the noise reduction circuit 32 of the present embodiment has an additional separate Y capacitor.

Next, the frequency characteristics of the noise reduction circuit 32 will be described with reference to FIGS. 4A to 4D. FIGS. 4A to 4D are graphs showing the frequency characteristics of the gain G of the noise reduction circuit 32 in relation to the leakage noise.

Figure 4A:
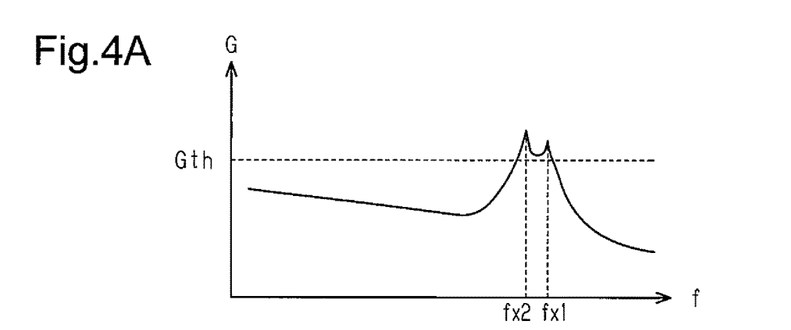
FIG. 4A is a graph showing the frequency characteristic of a noise reduction circuit having no filter circuits in relation to leakage noise.
Figure 4B:
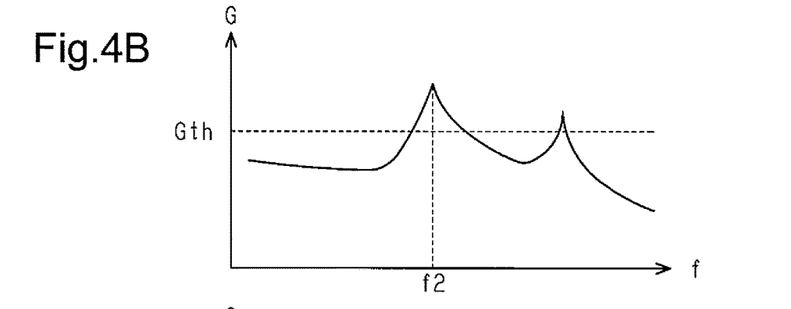
FIG. 4B is a graph showing the frequency characteristic of a noise reduction circuit having an output-side capacitor in relation to leakage noise.
Figure 4C:
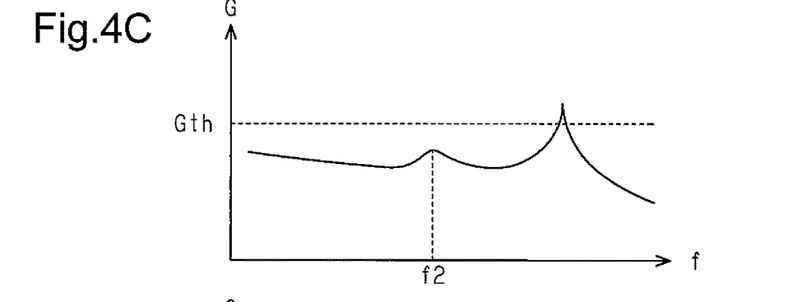
FIG. 4C is a graph showing the frequency characteristic of a noise reduction circuit having a second filter circuit in relation to leakage noise.
Figure 4D:
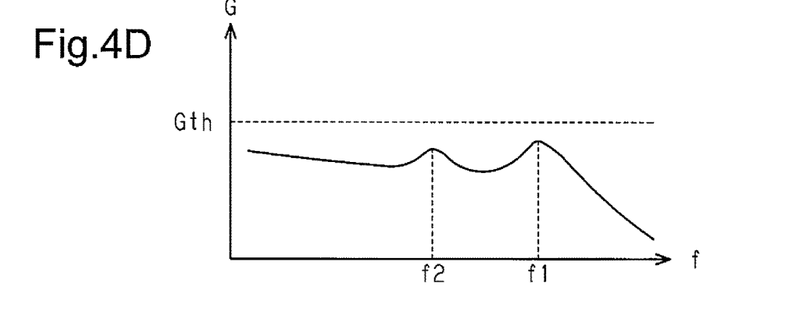
FIG. 4D is a graph showing the frequency characteristic of a noise reduction circuit having two filter circuits in relation to leakage noise.

FIGS. 4A to 4C are graphs to be compared. Specifically, FIG. 4A shows the frequency characteristic in the case in which neither of the resistors R1, R2 nor the capacitors C1, C2 are provided. FIG. 4B shows the frequency characteristic in the case in which none of the resistors R1, R2 and the input-side capacitor C1 are provided, but only the output-side capacitor C2 is provided. FIG. 4C shows the frequency characteristic in the case in which only the second filter circuit 72 is provided, but the first filter circuit 71 is not provided, that is, the case in which the output-side capacitor C2 and the output-side resistor R2 are provided. In contrast, FIG. 4D shows the frequency characteristic in the case in which the filter circuits 71 and 72 are both provided.

As shown in FIG. 4A, when neither the resistors R1, R2 nor the capacitors C1, C2 are provided, the resonance frequency fx1 of an unintended resonance circuit including the input-side parasitic capacitor Cx1 as a component and the resonance frequency fx2 of an unintended resonance circuit including the output-side parasitic capacitor Cx2 as a component are contained in the reduction target band. Therefore, the gain in the vicinity of the resonance frequencies fx1, fx2 is high. That is, the leakage noise having a frequency close to the resonance frequencies fx1, fx2 is scarcely reduced by the noise reduction circuit 32.

The allowable gain in the in-vehicle device 105 (in other words, the vehicle 100) is defined as an allowable gain Gth. The allowable gain Gth is specified by, for example, international standards. As shown in FIG. 4A, when neither the resistors R1, R2 nor the capacitors C1, C2 are provided, the gain G corresponding to the leakage noise in the vicinity of the resonance frequencies fx1, fx2 is higher than the allowable gain Gth. That is, it can be said that the leakage noise in the vicinity of the resonance frequencies fx1, fx2 is not sufficiently reduced by the noise reduction circuit 32. The allowable gain Gth is considered to be the threshold of the gain G required in the vehicle 100.

As shown in FIG. 4B, when the output-side capacitor C2 is provided, the output-side capacitor C2 is dominant, instead of the output-side parasitic capacitor Cx2. In this case, the gain G is high in the vicinity of the resonance frequency f2 of the second filter circuit 72.

In the frequency characteristic shown in FIG. 4B, the Q factor of the second filter circuit 72 is high since the output-side resistor R2 is not provided. Therefore, the gain G in the vicinity of the resonance frequency f2 of the second filter circuit 72 is higher than the allowable gain Gth.

In contrast, as shown in FIG. 4C, when the output-side resistor R2 is provided, the Q factor of the second filter circuit 72 is lowered by the output-side resistor R2.

Under conditions that the frequency of the leakage noise is equal to the resonance frequency f2 of the second filter circuit 72, the Q factor of the second filter circuit 72 at which the gain G of the noise reduction circuit 32 is equal to the allowable gain Gth is defined as a second specific Q factor. With this configuration of the present embodiment, the resistance value of the output-side resistor R2 is set to a value at which the Q factor of the second filter circuit 72 is lower than the second specific Q factor. Therefore, the gain G in the vicinity of the resonance frequency f2 of the second filter circuit 72 is lower than the allowable gain Gth as shown in FIG. 4C. In this case, the leakage noise in the vicinity of the resonance frequency f2 of the second filter circuit 72 is converted into heat by the output-side resistor R2.

That is, in the present embodiment, the output-side capacitor C2 is provided separately from the output-side parasitic capacitor Cx2. Thus, a path is formed through which the leakage noise actively flows is formed. Also, since the output-side resistor R2 is provided on the path, the leakage noise is absorbed.

As shown in FIG. 4D, when the input-side resistor R1 and the input-side capacitor C1 are provided, the input-side capacitor C1 is dominant over the input-side parasitic capacitor Cx1. In this case, the gain G is high in the vicinity of the resonance frequency f1 of the first filter circuit 71.

In this configuration, under conditions that the frequency of the leakage noise is equal to the resonance frequency f1 of the first filter circuit 71, the Q factor of the first filter circuit 71 at which the gain G of the noise reduction circuit 32 is equal to the allowable gain Gth is defined as a first specific Q factor. In the present embodiment, the resistance value of the input-side resistor R1 is set to a value at which the Q factor of the first filter circuit 71 is lower than the first specific Q factor. Therefore, the gain G in the vicinity of the resonance frequency f1 of the first filter circuit 71 is lower than the allowable gain Gth as shown in FIG. 4D. In this case, the leakage noise in the vicinity of the resonance frequency f1 of the first filter circuit 71 is converted into heat by the input-side resistor R1.

As described above, the leakage noise in the reduction target band generated by the inverter circuit 33 is reduced by the filter circuits 71, 72. This limits transmission of the leakage noise in the reduction target band to the outside of the in-vehicle inverter device 30 via the connector 31.

The present embodiment, which has been described above, achieves the following advantages.

(1) The in-vehicle inverter device 30 converts the DC power from the in-vehicle electric storage device 104 into AC power. The in-vehicle inverter device 30 includes the noise reduction circuit 32 and the inverter circuit 33. The noise reduction circuit 32 has the common mode choke coil 50, which reduces common mode noise and normal mode noise contained in the DC power from the in-vehicle electric storage device 104. The inverter circuit 33 receives the DC power in which the noise has been reduced by the noise reduction circuit 32.

With this configuration, the common mode choke coil 50 can be used to reduce common mode noise and normal mode noise of the DC power delivered to the in-vehicle inverter device 30. As a result, the inverter circuit 33 receives the DC power, in which the noise has been reduced. It is thus possible to restrict malfunction of the inverter circuit 33 such as failure in output of desired AC power due to noise.

In this configuration, the noise reduction circuit 32 includes the serially-connected body of the input-side resistor R1 and the input-side capacitor C1 provided on the input side of the common mode choke coil 50 and the serially-connected body of the output-side resistor R2 and the output-side capacitor C2 provided on the output side of the common mode choke coil 50. The noise reduction circuit 32 includes the first filter circuit 71 and the second filter circuit 72. The first filter circuit 71 is constituted by the common mode choke coil 50, the input-side capacitor C1, and the input-side resistor R1. The second filter circuit 72 is constituted by the common mode choke coil 50, the output-side capacitor C2, and the output-side resistor R2. The noise reduction circuit 32 reduces the leakage noise generated in the inverter circuit 33 with the both filter circuits 71, 72.

With this configuration, even if an unintended resonance circuit is formed in the in-vehicle inverter device 30, it is possible to preferentially consume the leakage noise in the filter circuits 71, 72. It is thus possible to restrict increase in the amplitude of the leakage noise due to the resonance phenomenon of the unintended resonance circuit. This limits the leakage noise from the in-vehicle inverter device 30 to the outside.

Furthermore, since the filter circuits 71, 72 respectively have the resistors R1, R2, the Q factors of both filter circuits 71, 72 are low. This reduces the leakage noise in the vicinity of the resonance frequencies f1, f2 of the filter circuits 71, 72. Therefore, outflow noise can be suppressed in a wide frequency band that includes resonance frequencies of unintended resonance circuits.

Specifically, the inventors discovered that components (the parasitic capacitors Cx1, Cx2 and the parasitic inductors Lx1, Lx2) constituting an unintended resonance circuit exist on both of the input side and the output side of the common mode choke coil 50. The inventors also discovered that an unintended resonance circuit including these components generates a frequency at which leakage noise cannot be reduced.

In this regard, the present embodiment provides the input-side capacitor C1 and the output-side capacitor C2 on the input side and the output side of the common mode choke coil 50, respectively. This creates, on both sides of the common mode choke coil 50, path through which leakage noise easily flow compared to the unintended resonance circuit. This allows the flow of the leakage noise to be controlled and restrains the amplitude of the leakage noise from being increased by the resonance phenomenon of the unintended resonance circuit. Also, since the resistors R1, R2 are provided on the paths, the gain G is raised at the resonance frequencies f1, f2 of the filter circuits 71, 72. This allows the leakage noise to be reduced in a wide frequency band.

(2) The capacitance of the input-side capacitor C1 is set to be higher than the capacitance of the input-side parasitic capacitor Cx1, and the capacitance of the output-side capacitor C2 is set to be higher than the capacitance of the output-side parasitic capacitor Cx2. With this configuration, since the capacitors C1, C2 are dominant over the parasitic capacitors Cx1, Cx2 existing on both sides of the common mode choke coil 50, the filter circuits 71, 72 are dominant over the unintended resonance circuits including the parasitic capacitors Cx1, Cx2 as components. Thus, it is possible to reduce the influence of the unintended resonance circuits.

(3) The in-vehicle inverter device 30 includes the connector 31, to which the DC power from the in-vehicle electric storage device 104 is delivered, and the wires 43a, 43b, which connect the connector 31 and the noise reduction circuit 32 to each other. The wires 43a, 43b are connected to the serially-connected body of the input-side capacitor C1 and the input side resistance R1. With this configuration, the parasitic inductors Lx1, Lx2 of the wires 43a, 43b and the input-side capacitor C1 constitute the LC resonance circuit 63. The Q factor of the LC resonance circuit 63 is reduced by the input-side resistor R1. This suppresses adverse influences caused by the parasitic inductors Lx1, Lx2 of the wires 43a, 43b.

Specifically, since the parasitic inductors Lx1, Lx2 are present in the wires 43a, 43b, a resonance phenomenon may occur in the resonance circuit formed by the parasitic inductors Lx1, Lx2 and any parasitic capacitor in a high frequency band. When a resonance phenomenon occurs, the amplitude of the leakage noise is increased, which increases the gain G in the vicinity of the resonance frequency of the resonance circuit. In particular, since the parasitic inductors Lx1, Lx2 constitute resonance circuits with any parasitic capacitors, it is sometimes difficult to control the resonance phenomenon.

In contrast, the present embodiment has the input-side capacitor C1, which constitutes the LC resonance circuit 63 in conjunction with the parasitic inductors Lx1, Lx2. Thus, it is possible to restrict the parasitic inductors Lx1, Lx2 from forming resonance circuits with any parasitic capacitors, and it is possible to control the resonance phenomenon caused by the parasitic inductors Lx1, Lx2. By reducing the Q factor of the LC resonance circuit 63 with the input-side resistor R1, it is possible to reduce the leakage noise in the vicinity of the resonance frequency of the LC resonance circuit 63. This restrains the gain G from increasing due to the parasitic inductors Lx1, Lx2 of the wires 43a, 43b.

(4) The inverter circuit 33 includes the switching elements Qu1 to Qw2, which are subjected to the PWM control to convert DC power into AC power. At this time, in the inverter circuit 33, leakage noise is generated that includes the switching frequencies (more specifically, the carrier frequencies) of the switching elements Qu1 to Qw2 and the harmonic components thereof. In this regard, in the present embodiment, since the noise reduction circuit 32 reduces the leakage noise in a wide frequency band, it is possible to reduce adverse influences due to the leakage noise to the in-vehicle device 105 from the in-vehicle inverter device 30.

(5) The in-vehicle motor-driven compressor 10 includes the in-vehicle inverter device 30, the electric motor 11, which is driven by the in-vehicle inverter device 30, and the compression portion 12, which is driven by the electric motor 11 to compress fluid. Accordingly, it is possible to operate the in-vehicle motor-driven compressor 10 while suppressing leakage noise from the in-vehicle inverter device 30 in a wide frequency band.

The above described embodiment may be modified as follows.

The magnitude relationship between the capacitance of the input-side capacitor C1 and the capacitance of the output-side capacitor C2 may be arbitrarily determined. That is, these values may be equal to or different from each other.

The magnitude relationship between the resistance value of the input-side resistor R1 and the resistance value of the output-side resistor R2 may be arbitrarily determined. That is, these values may be equal to or different from each other.

As long as the first filter circuit 71 includes the common mode choke coil 50, the input-side capacitor C1, and the input-side resistor R1, the first filter circuit 71 may include other elements.

As long as the second filter circuit 72 includes the common mode choke coil 50, the output-side capacitor C2, and the output-side resistor R2, the second filter circuit 72 may include other elements.

The positions of the parasitic capacitors Cx1, Cx2 may be changed. For example, the input-side parasitic capacitor Cx1 can be located on the first input line 61a or at a stage before the input-side capacitor C1 and the input-side resistor R1. In addition, when the frame of the vehicle 100 is used as the ground, the input-side parasitic capacitor Cx1 may be connected to the ground. The same applies to the output-side parasitic capacitor Cx2. In addition, a parasitic capacitor may be present in the inverter circuit 33.

The parasitic inductance of each of the lines 61a, 61b, 62a, 62b and the wires connecting the noise reduction circuit 32 and the inverter circuit 33 may be so high that it cannot be ignored. Even in this case, the influence of these parasitic inductances is suppressed by the LC resonance circuit, which is formed by these parasitic inductances and the serially-connected body of the capacitors C1, C2 and the resistors R1, R2.

The inverter input terminals 33a, 33b of the inverter circuit 33 are not indispensable. For example, the noise reduction circuit 32 and the inverter circuit 33 may be unitized to omit the inverter input terminals 33a, 33b.

Although the smoothing capacitor C3 is part of the noise reduction circuit 32. However, the smoothing capacitor C3 may be part of the inverter circuit 33.

The Y capacitor of the noise reduction circuit 32 may be omitted.

The object on which the in-vehicle inverter device 30 is mounted is not limited to the in-vehicle motor-driven compressor 10.

The in-vehicle device 105 is not limited to a PCU. The boost converter 105a may be omitted.

The in-vehicle motor-driven compressor 10 does not necessary need to be employed for the in-vehicle air conditioner 101, but may be employed for other devices. For example, if the vehicle 100 is a fuel cell vehicle, the motor-driven compressor 10 may be used in an air supplying device that supplies air to the fuel cell. That is, the fluid to be compressed is not limited to refrigerant, but may be any fluid such as air.

The in-vehicle fluid machine is not limited to the in-vehicle motor-driven compressor 10 provided with the compression portion 12 for compressing fluid. For example, in the case in which the vehicle 100 is a fuel cell vehicle, the in-vehicle fluid machine may be an electric pump device having a pump that supplies hydrogen to the fuel cell without compressing it and an electric motor that drives the pump. In this case, the in-vehicle inverter device 30 may be used for the electric motor for driving the pump.

The in-vehicle inverter device 30 may be used to drive an electric motor other than the one used in the in-vehicle fluid machine. For example, if the vehicle 100 has an electric motor employed for traveling and/or generating power, the in-vehicle inverter device 30 may be used to drive that electric motor.

The DC power supply is not limited to the in-vehicle electric storage device 104, but may be any device. For example, the DC power supply may be a charging stand or the like provided outside the vehicle 100.

The above illustrated embodiment and any of the modifications may be employed in combination.

The invention claimed is:

1. An in-vehicle motor-driven compressor comprising:
an in-vehicle inverter device configured to convert DC power to AC power,
an electric motor that is driven by the in-vehicle inverter device; and
a compression portion configured to compress fluid by driving the electric motor, wherein
the in-vehicle inverter device includes
a power input portion to which the DC power from a DC power supply is delivered;
a noise reduction circuit that includes a common mode choke coil configured to reduce common mode noise and normal mode noise contained in the DC power, the common mode choke coil including a first winding and a second winding;

a first wire and a second wire that connect the power input portion and the noise reduction circuit to each other; and an inverter circuit that includes a switching element and receives the DC power in which noise has been reduced by the noise reduction circuit, the noise reduction circuit includes an input-side capacitor and an input-side resistor that are provided on an input side of the common mode choke coil and connected in series to each other, an output-side capacitor and an output-side resistor that are provided on an output side of the common mode choke coil and connected in series to each other, a first filter circuit that includes the common mode choke coil, the input-side capacitor, and the input-side resistor, and a second filter circuit that includes the common mode choke coil, the output-side capacitor, and the output-side resistor, the first filter circuit and the second filter circuit are configured to reduce leakage noise generated in the inverter circuit, the noise reduction circuit further includes a smoothing capacitor having a higher capacitance than the output-side capacitor, the smoothing capacitor being connected in parallel to the common mode choke coil, a first input portion connected to the first wire, a second input portion connected to the second wire, first and second output portions connected to the inverter circuit, a first input line that connects the first input portion and an input end of the first winding to each other, a first output line that connects an output end of the first winding and the first output portion to each other, a second input line that connects the second input portion and an input end of the second winding to each other, and a second output line that connects an output end of the second winding and the second output portion to each other, a serially-connected body constituted by the input-side capacitor and the input-side resistor is connected to the first input line and the second input line, and a serially-connected body constituted by the output-side capacitor and the output-side resistor is connected to the first output line and the second output line.

2. The in-vehicle motor-driven compressor according to claim 1, wherein:

a capacitance of the input-side capacitor is set to be higher than a capacitance of an input-side parasitic capacitor that exists on the input side of the common mode choke coil, and a capacitance of the output-side capacitor is set to be higher than a capacitance of an output-side parasitic capacitor that exists on the output side of the common mode choke coil.

* * * * *